US011345776B2

(12) United States Patent
Banno et al.

(10) Patent No.: US 11,345,776 B2
(45) Date of Patent: May 31, 2022

(54) CARBOXYL-GROUP-CONTAINING AQUEOUS RESIN COMPOSITION AND METHOD FOR MANUFACTURING POLYCARBODIIMIDE COMPOUND

(71) Applicant: NISSHINBO CHEMICAL INC., Tokyo (JP)

(72) Inventors: Kimiyo Banno, Chiba (JP); Kenichi Yanagisawa, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 257 days.

(21) Appl. No.: 16/465,391

(22) PCT Filed: Nov. 22, 2017

(86) PCT No.: PCT/JP2017/041958
§ 371 (c)(1),
(2) Date: May 30, 2019

(87) PCT Pub. No.: WO2018/123362
PCT Pub. Date: Jul. 5, 2018

(65) Prior Publication Data
US 2020/0017628 A1 Jan. 16, 2020

(30) Foreign Application Priority Data

Dec. 27, 2016 (JP) .............................. JP2016-253891

(51) Int. Cl.
C09D 175/08 (2006.01)
C08G 18/09 (2006.01)
C08G 18/48 (2006.01)
C08G 18/83 (2006.01)
C08G 18/10 (2006.01)
C08G 18/32 (2006.01)
C08G 18/75 (2006.01)
C09D 175/04 (2006.01)
C08G 18/79 (2006.01)
C08G 18/28 (2006.01)
B29C 41/14 (2006.01)
B29K 79/00 (2006.01)

(52) U.S. Cl.
CPC ......... *C08G 18/833* (2013.01); *C08G 18/095* (2013.01); *C08G 18/10* (2013.01); *C08G 18/283* (2013.01); *C08G 18/3228* (2013.01); *C08G 18/4887* (2013.01); *C08G 18/755* (2013.01); *C08G 18/797* (2013.01); *C09D 175/04* (2013.01); *C09D 175/08* (2013.01); *B29C 41/14* (2013.01); *B29K 2079/08* (2013.01)

(58) Field of Classification Search
CPC .. C08G 18/833; C08G 18/10; C08G 18/3228; C08G 18/4887; C08G 18/755; C08G 18/095; C08G 18/283; C08G 18/797; C09D 175/04; C09D 175/08
See application file for complete search history.

(56) References Cited

U.S. PATENT DOCUMENTS

| 4,910,339 A | 3/1990 | Henning et al. |
| 5,763,538 A | 6/1998 | Hunter et al. |
| 5,856,014 A * | 1/1999 | Imashiro .............. C09D 167/00 524/195 |

(Continued)

FOREIGN PATENT DOCUMENTS

| CN | 1182100 A | 5/1998 |
| CN | 100543056 C | 9/2009 |

(Continued)

OTHER PUBLICATIONS

Chinese Office Action and Search Report for Chinese Application No. 201780079571.0, dated Nov. 30, 2020.
International Search Report (PCT/ISA/210) issued in PCT/JP2017/041958, dated Feb. 20, 2018.
European Patent Office and extended search report issued in the corresponding European Patent Application No. 17889227.9 dated Jul. 13, 2020.

(Continued)

*Primary Examiner* — Michael L Leonard
(74) *Attorney, Agent, or Firm* — Birch, Stewart, Kolasch & Birch, LLP

(57) ABSTRACT

Disclosed is a carboxy group-containing aqueous resin composition containing a carboxy group-containing aqueous resin and a polycarbodiimide compound (X) represented by the following general formula (1):

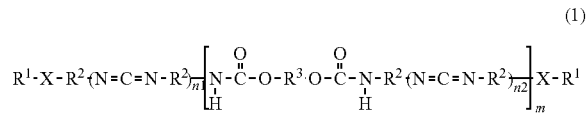

(1)

wherein $R^1$ represents a residue obtained by removing a functional group capable of reacting with an isocyanate from a hydrophilic compound having the functional group capable of reacting with an isocyanate; $R^2$ represents a divalent residue obtained by removing isocyanate groups from a diisocyanate compound; $R^3$ represents a divalent residue obtained by removing hydroxy groups from a glycol compound; X represents a group to be formed through a reaction between the hydrophilic compound and the diisocyanate compound; n1 represents a number of 1 to 10; n2 represents a number of 1 to 10; m represents a number of 1 to 5; and plural $R^1$'s may be the same or different and plural $R^2$'s may be the same or different.

10 Claims, No Drawings

(56) References Cited

U.S. PATENT DOCUMENTS

| | | | | |
|---|---|---|---|---|
| 6,153,718 A | * | 11/2000 | Imashiro | C08G 18/025 528/67 |
| 6,248,819 B1 | | 6/2001 | Masuda et al. | |
| 2006/0106189 A1 | | 5/2006 | Hesselmans et al. | |
| 2009/0246393 A1 | * | 10/2009 | Ambrose | C08G 18/2865 427/386 |
| 2015/0353708 A1 | * | 12/2015 | Itoh | C08L 67/00 524/195 |
| 2020/0283639 A1 | * | 9/2020 | Nishioka | C08K 5/29 |

FOREIGN PATENT DOCUMENTS

| | | | |
|---|---|---|---|
| CN | 104937028 A | | 9/2015 |
| DE | 11 2015 000 659 T5 | | 11/2016 |
| JP | 10-60272 A | | 3/1998 |
| JP | 2001-11151 A | | 1/2001 |
| JP | 2001-11152 A | | 1/2001 |
| JP | 2002-363250 A | | 12/2002 |
| JP | 2007-521360 A | | 8/2007 |
| JP | 2011-94102 A | | 5/2011 |
| JP | 2011/094104 | * | 5/2011 |
| JP | 2014-47225 A | | 3/2014 |
| TW | 201643218 A | | 12/2016 |
| WO | WO 2007/089142 A1 | | 8/2007 |

OTHER PUBLICATIONS

Chinese Office Action and Search Report for Chinese Application No. 201780079571.0, dated Jul. 7, 2021.

Shu et al., "Coating Material Formulation Design and Preparation," Chengdu: Southwest Jiaotong University Press, Aug. 2014, p. 118 (7 pages total), with English translation.

* cited by examiner

CARBOXYL-GROUP-CONTAINING AQUEOUS RESIN COMPOSITION AND METHOD FOR MANUFACTURING POLYCARBODIIMIDE COMPOUND

TECHNICAL FIELD

The present invention relates to a carboxy group-containing aqueous resin composition, a molded article formed of the resin composition, and a method of producing a polycarbodiimide compound to be used for the resin composition.

BACKGROUND ART

An aqueous resin that is water-soluble or water-dispersible is used in many fields inclusive of paints, inks, fiber processing agents, adhesives, and coating agents. As for the aqueous resin, in order to give water solubility or water dispersibility to the resin itself, in general, a carboxy group is introduced. As a measure for improving various physical properties of a coating film of such an aqueous resin, such as strength, water resistance, and durability, there is adopted a method of jointly using a crosslinking agent capable of reacting with the carboxy group which the aqueous resin has to form a crosslinked structure, such as a carbodiimide compound.

For example, PTL 1 discloses an aqueous resin dispersion composition having a polyurethane resin (A) having a polymerizable unsaturated bond, a compound (A') having a polymerizable unsaturated bond, and a carbodiimide compound (B) dispersed in an aqueous medium. In addition, PTL 2 discloses a water-based polyurethane resin composition containing, as essential components, an anionic water-based polyurethane resin and a carbodiimide-based compound capable of reacting with an anionic group and having a specified structure.

CITATION LIST

Patent Literature

PTL 1: JP 2014-047225 A
PTL 2: JP 2002-363250 A

SUMMARY OF INVENTION

Technical Problem

However, in the aqueous resin composition, in which a carbodiimide compound of an aqueous solution type is compounded, as described in PTL 1, there were involved such problems that the storage stability is poor in a one-pack type, and a liquid viscosity increases. In addition, in the aqueous resin composition, in which a carbodiimide compound of an emulsion type is compounded, as described in PTL 2, though a change of the liquid viscosity after the storage is a few, there were involved such problems that the strength of a coating film formed using the aqueous resin composition after the storage is significantly lowered as compared with the strength of a coating film formed using the aqueous resin composition before the storage (at the initial stage), and the strength retention is poor.

In view of the foregoing actual circumstances, the present invention has been made, and an object thereof is to provide a carboxy group-containing aqueous resin composition, in which on storing the carboxy group-containing aqueous resin composition, an increase of the viscosity to be caused due to the storage is low, a lowering of the tensile strength of a coating film formed using the aqueous resin composition after the storage is a few as compared with the tensile strength of a coating film formed using the aqueous resin composition before the storage (at the initial stage), and the storage stability is excellent; a molded article formed of the resin composition; and a method of producing a polycarbodiimide compound to be used for the resin composition.

Solution to Problem

In order to solve the aforementioned problem, the present inventors made extensive and intensive investigations. As a result, it has been found that a carboxy group-containing aqueous resin composition containing a polycarbodiimide compound (X) having a specified structure solves the aforementioned problem. The present invention has been accomplished on a basis of such findings.

Specifically, the present invention provides the following [1] to [12].

[1] A carboxy group-containing aqueous resin composition containing a carboxy group-containing aqueous resin and a polycarbodiimide compound (X) represented by the following general formula (1):

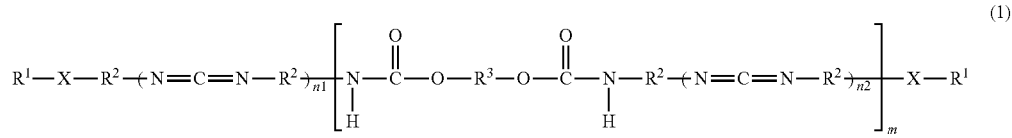

wherein $R^1$ represents a residue obtained by removing a functional group capable of reacting with an isocyanate from a hydrophilic compound having the functional group capable of reacting with an isocyanate; $R^2$ represents a divalent residue obtained by removing isocyanate groups from a diisocyanate compound; $R^3$ represents a divalent residue obtained by removing hydroxy groups from a glycol compound; X represents a group to be formed through a reaction between the hydrophilic compound and the diisocyanate compound; n1 represents a number of 1 to 10; n2 represents a number of 1 to 10; m represents a number of 1 to 5; and plural $R^1$'s may be the same or different and plural $R^2$'s may be the same or different.

[2] The carboxy group-containing aqueous resin composition as set forth in the above [1], wherein the carboxy group-containing aqueous resin is an aqueous polyurethane resin, an acrylic resin, a polyester resin, or a rubber-based latex resin.

[3] The carboxy group-containing aqueous resin composition as set forth in the above [1] or [2], wherein the carboxy group-containing aqueous resin is an aqueous polyurethane resin.

[4] The carboxy group-containing aqueous resin composition as set forth in any of the above [1] to [3], wherein the glycol compound is at least one selected from the group consisting of ethylene glycol, propylene glycol, 1,4-butanediol, diethylene glycol, dipropylene glycol, triethylene glycol, tripropylene glycol, polyethylene glycol, and polypropylene glycol.

[5] The carboxy group-containing aqueous resin composition as set forth in any of the above [1] to [4], wherein the diisocyanate compound is dicyclohexylmethane-4,4'-diisocyanate.

[6] The carboxy group-containing aqueous resin composition as set forth in any of the above [1] to [5], wherein the hydrophilic compound is at least one selected from the group consisting of compounds represented by the following general formulae (2), (3), (4), and (5):

$$R^4O-(CH_2-CHR^5-O)_p-H \quad (2)$$

wherein $R^4$ is an alkyl group having 1 to 4 carbon atoms; $R^5$ is a hydrogen atom or a methyl group; and p is an integer of 4 to 30, $$(R^6)_2-N-R^7-OH \quad (3)$$

wherein $R^6$ is an alkyl group having 1 to 6 carbon atoms, and $R^7$ is an alkylene group having 1 to 10 carbon atoms or a polyoxyalkylene group, $$(R^8)_2-N-R^9-NH_2 \quad (4)$$

wherein $R^8$ is an alkyl group having 1 to 6 carbon atoms, and $R^9$ is an alkylene group having 1 to 10 carbon atoms or a polyoxyalkylene group, and $$HO-R^{10}-SO_3M \quad (5)$$

wherein $R^{10}$ is an alkylene group having 1 to 10 carbon atoms, and M is an alkali metal, such as Na and K.

[7] The carboxy group-containing aqueous resin composition as set forth in any of the above [1] to [6], further containing at least one selected from water and a hydrophilic solvent.

[8] The carboxy group-containing aqueous resin composition as set forth in any of the above [1] to [7], wherein an equivalent ratio of the carbodiimide group of the polycarbodiimide compound (X) to the carboxy group of the carboxy group-containing aqueous resin is from 0.1 to 1.2.

[9] The carboxy group-containing aqueous resin composition as set forth in any of the above [1] to [8], which is used for dipping molding.

[10] A molded article, which is formed of the carboxy group-containing aqueous resin composition as set forth in the above [9].

[11] A method of producing a polycarbodiimide compound (X) represented by the general formula (1), the method including the following step (A) and step (B):

Step (A): a step of subjecting a diisocyanate compound to a carbodiimidation reaction in the presence of a catalyst, to obtain a polycarbodiimide (Y) having an isocyanate group on both ends thereof; and Step (B): a step of allowing a hydrophilic compound having a functional group capable of reacting with an isocyanate in an amount of 0.5 equivalents or less to a total amount of the isocyanate group which the polycarbodiimide (Y) has on both ends thereof, the polycarbodiimide (Y), and a glycol compound to react with each other.

[12] The method of producing a polycarbodiimide compound (X) as set forth in the above [11], wherein the step (B) includes a step (B1) of allowing the polycarbodiimide (Y) to react with the hydrophilic compound having a functional group capable of reacting with an isocyanate in an amount of 0.5 equivalents or less to a total amount of the isocyanate group which the polycarbodiimide (Y) has on both ends thereof, to obtain a polycarbodiimide (Z) having a hydrophilic group on an end thereof; and a step (B2) of allowing the polycarbodiimide (Z) obtained in the step (B1) to react with a glycol compound, to chain-extend the polycarbodiimide (Z), thereby obtaining the polycarbodiimide compound (X).

Advantageous Effects of Invention

In accordance with the present invention, it is possible to provide a carboxy group-containing aqueous resin composition, in which on storing the carboxy group-containing aqueous resin composition, an increase of the viscosity to be caused due to the storage is low, a lowering of the tensile strength of a coating film formed using the aqueous resin composition after the storage is a few as compared with the tensile strength of a coating film formed using the aqueous resin composition before the storage (at the initial stage), and the storage stability is excellent; a molded article formed of the resin composition; and a method of producing a polycarbodiimide compound to be used for the resin composition.

DESCRIPTION OF EMBODIMENTS

[Carboxy Group-Containing Aqueous Resin Composition]

The carboxy group-containing aqueous resin composition of the present invention contains a carboxy group-containing aqueous resin and a polycarbodiimide compound (X) represented by the following general formula (1).

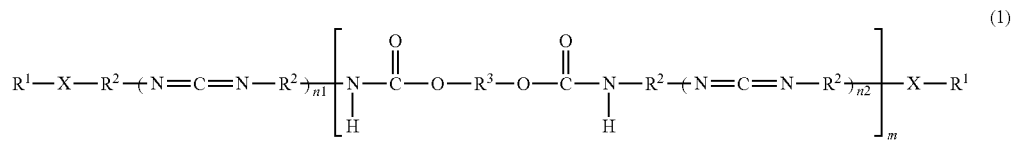

In the formula, $R^1$ represents a residue obtained by removing a functional group capable of reacting with an isocyanate from a hydrophilic compound having the functional group capable of reacting with an isocyanate; $R^2$ represents a divalent residue obtained by removing isocyanate groups from a diisocyanate compound; $R^3$ represents a divalent residue obtained by removing hydroxy groups from a glycol compound; X represents a group to be formed through a reaction between the hydrophilic compound and the diisocyanate compound; n1 represents a number of 1 to 10; n2 represents a number of 1 to 10; m represents a number of 1 to 5; and plural $R^1$'s may be the same or different and plural $R^2$'s may be the same or different.

[Carboxy Group-Containing Aqueous Resin]

The carboxy group-containing aqueous resin which is used in the present invention is not particularly limited so long as it has a carboxy group. Examples thereof include an aqueous polyurethane resin, an acrylic resin, a polyester resin, and a rubber-based latex resin, and these resins can be preferably used. Above all, an aqueous polyurethane resin is preferred from the viewpoint of exhibiting the effects of the present invention.

These resins may be used alone or may be used in combination of two or more thereof.

Examples of the aqueous polyurethane resin include resins obtained by allowing a polyol, a carboxy group-containing polyol, and a carboxy group-containing urethane-based prepolymer obtained from a polyisocyanate compound to react with a neutralizing agent and a chain extender in the presence of an organic solvent or water, followed by desolvation under reduced pressure.

Examples of the polyol that is a raw material of the aqueous polyurethane resin include polymers or copolymers of a low-molecular weight polyol. Specifically, examples thereof include a polyether polyol, a polyester polyol, a polycarbonate polyol, a polyether ester polyol, a polycarbonate ester polyol, and a polycarbonate ether polyol. These may be used alone or may be used in combination of two or more thereof.

The carboxy group-containing polyol that is a raw material of the aqueous polyurethane resin is a compound containing two or more hydroxy groups and one or more carboxy groups in one molecule thereof, and preferably one containing a compound having two hydroxy groups and one carboxy group in one molecule thereof.

Examples of the carboxy group-containing polyol include a dimethylolalkanoic acid, such as 2,2-dimethylolpropionic acid and 2,2-dimethylolbutanoic acid, N,N-bishydroxyethyl glycine, N,N-bishydroxyethyl alanine, 3,4-dihydroxybutanesulfonic acid, and 3,6-dihydroxy-2-toluenesulfonic acid. Above all, from the viewpoint of easiness of availability, a dimethylolalkanoic acid is preferred, and 2,2-dimethylolpropionic acid is more preferred. These may be used alone or may be used in combination of two or more thereof.

As the raw material of the aqueous polyurethane resin, in addition to the aforementioned polyol and carboxy group-containing polyol, other polyol can be used as the need arises. As the other polyol, a polyol can be used without being particularly limited so long as it is a polyol other than those exemplified for the aforementioned polyol and carboxy group-containing polyol.

Although the polyisocyanate compound that is a raw material of the aqueous polyurethane resin is not particularly limited, specifically, examples thereof include aromatic polyisocyanate compounds, such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, 4,4',4''-triphenylmethane triisocyanate, m-isocyanatophenylsulfonyl isocyanate, and p-isocyanatophenylsulfonyl isocyanate; aliphatic polyisocyanate compounds, such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanate hexanoate; and alicyclic polyisocyanate compounds, such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-dicyclohexene-1,2-dicarboxylate, 2,5-norbornane diisocyanate, and 2,6-norbornane diisocyanate. These polyisocyanate compounds may be used alone or may be used in combination of two or more thereof.

Although the number of isocyanate groups per one molecule of the polyisocyanate compound is typically 2, a polyisocyanate having 3 or more isocyanate groups, such as triphenylmethane triisocyanate, can also be used within a range where the polyurethane resin in the present invention is not gelated.

Among the aforementioned polyisocyanate compounds, 4,4'-diphenylenemethane diisocyanate (MDI), isophorone diisocyanate (IPDI), and 4,4'-dicyclohexylmethane diisocyanate (hydrogenated MDI) are preferred from the viewpoints of controlling the reactivity, giving the strength, and so on.

Examples of the neutralizing agent include organic amines, such as trimethylamine, triethylamine, triisopropylamine, tributylamine, triethanolamine, N-methyl diethanolamine, N-phenyl diethanolamine, dimethyl ethanolamine, diethyl ethanolamine, N-methylmorpholine, pyridine, and 2-(dimethylamino)-2-methyl-1-propanol; and ammonia. Among those mentioned above, organic amines are preferred, tertiary amines are more preferred, and triethylamine and 2-(dimethylamino)-2-methyl-1-propanol are especially preferred.

Examples of the chain extender include compounds having reactivity with an isocyanate group. Specifically, examples thereof include amine compounds, such as ethylenediamine, 1,4-tetramethylenediamine, 2-methyl-1,5-pentanediamine, 1,4-butanediamine, 1,6-hexamethylenediamine, 1,4-hexamethylenediamine, 3-aminomethyl-3,5,5-trimethylcyclohexylamine, 1,3-bis(aminomethyl)cyclohexane, xylylenediamine, piperazine, adipoyl hydrazide, hydrazine, 2,5-dimethylpiperazine, diethylenetriamine, and triethylenetetramine; diol compounds, such as ethylene glycol, propylene glycol, 1,4-butanediol, and 1,6-hexanediol; polyalkylene glycols, represented by polyethylene glycol; and water. Above all, amine compounds are preferred, and ethylenediamine is more preferred. These may be used alone or may be used in combination of two or more thereof.

Examples of the acrylic resin include acrylic resins obtained through copolymerization of a polymerizable unsaturated carboxylic acid or an anhydride thereof and a (meth)acrylic acid ester or an acrylic monomer other than (meth)acrylic acid, and optionally, α-methylstyrene, vinyl acetate, or the like by a polymerization method, such as emulsion polymerization, solution polymerization, and block polymerization.

Specifically, examples of the polymerizable unsaturated carboxylic acid and anhydride thereof include (meth)acrylic acid, itaconic acid, maleic acid, fumaric acid, crotonic acid, and anhydrides thereof.

Examples of the (meth)acrylic acid ester include methyl (meth)acrylate, ethyl(meth)acrylate, butyl (meth)acrylate, 2-ethylhexyl (meth)acrylate, and 2-hydroxyethyl (meth)acrylate.

Examples of the acrylic monomer other than (meth)acrylic acid include (meth)acrylamide and (meth)acrylonitrile.

Examples of the polyester resin include polyester resins obtained by chain-extending a polyester glycol having a hydroxy group on an end thereof and a tetracarboxylic acid dianhydride by means of an esterification reaction.

Examples of the rubber-based latex resin include a natural rubber-based latex resin having a carboxy group and a synthetic rubber-based latex resin having a carboxy group.

Although the carboxy group-containing aqueous resin varies with its kind or molecular weight, its acid value of resin solid content on a basis of the carboxy group is typically 5 to 40 mgKOH/g, and preferably 10 to 30 mgKOH/g.

[Polycarbodiimide Compound (X)]

The polycarbodiimide compound (X) which is used in the present invention is represented by the general formula (1) and forms a crosslinked structure together with the carboxy group-containing aqueous resin, thereby improving strength, water resistance, durability, and the like of a coating film of the aqueous resin.

In the general formula (1), $R^2$ represents a divalent residue obtained by removing isocyanate groups from a diisocyanate compound. Examples of the diisocyanate compound include an aromatic diisocyanate compound, an aliphatic diisocyanate compound, an alicyclic diisocyanate compound, a heterocyclic diisocyanate compound, and an araliphatic diisocyanate.

Specifically, examples thereof include 1,5-naphthylene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, and 2,5(2,6)-bis(isocyanatomethyl) bicyclo[2.2.1]heptane.

Of these, dicyclohexylmethane-4,4'-diisocyanate and tetramethylxylylene diisocyanate are preferred from the viewpoints of easiness of synthesis of the polycarbodiimide compound and storage stability of the synthesized polycarbodiimide compound, and dicyclohexylmethane-4,4'-diisocyanate is more preferred from the viewpoint of easiness of availability.

In the general formula (1), $R^1$ represents a residue obtained by removing a functional group capable of reacting with an isocyanate from a hydrophilic compound having the functional group capable of reacting with an isocyanate. The hydrophilic compound is preferably at least one selected from the group consisting of compounds represented by the following general formulae (2), (3), (4), and (5); more preferably at least one selected from the group consisting of the following general formulae (2) and (3) from the viewpoint of improving solubility or dispersibility in water or a hydrophilic solvent of the polycarbodiimide compound (X); and still more preferably the following general formula (2).

$$R^4O-(CH_2-CHR^5-O)_p-H \quad (2)$$

In the formula, R is an alkyl group having 1 to 4 carbon atoms; $R^5$ is a hydrogen atom or a methyl group; and p is an integer of 4 to 30.

Examples of the alkyl group having 1 to 4 carbon atoms include a methyl group, an ethyl group, a n-propyl group, an isopropyl group, a n-butyl group, a sec-butyl group, an isobutyl group, and a t-butyl group.

$R^4$ is preferably a methyl group, and $R^5$ is preferably a hydrogen atom.

p is an integer of 4 to 30, and from the viewpoint of improving an affinity between the polycarbodiimide compound (X) and the carboxy group-containing aqueous resin, p is preferably an integer of 7 to 25, and more preferably an integer of 8 to 20.

$$(R^6)_2-N-R^7-OH \quad (3)$$

In the formula, $R^6$ is an alkyl group having 1 to 6 carbon atoms, and $R^7$ is an alkylene group having 1 to 10 carbon atoms or a polyoxyalkylene group.

Examples of the alkyl group having 1 to 6 carbon atoms for $R^6$ include a methyl group, an ethyl group, a n-propyl group, an isopropyl group, a n-butyl group, a sec-butyl group, an isobutyl group, a t-butyl group, a n-pentyl group, a n-hexyl group, and a cyclohexyl group. Above all, a methyl group, an ethyl group, a n-propyl group, an isopropyl group, a n-butyl group, a sec-butyl group, an isobutyl group, and a t-butyl group are preferred.

Examples of the alkylene group having 1 to 10 carbon atoms for $R^7$ include a methylene group, an ethylene group, a propylene group, a tetramethylene group, a pentamethylene group, a hexamethylene group, a heptamethylene group, an octamethylene group, a nonamethylene group, and a decamethylene group. The hydrogen atom(s) of the alkylene group may be substituted with a monovalent hydrocarbon group, such as a methyl group.

$R^7$ is preferably an ethylene group, a propylene group, a tetramethylene group, or a pentamethylene group.

$$(R^8)_2-N-R^9-NH_2 \quad (4)$$

In the formula, $R^8$ is an alkyl group having 1 to 6 carbon atoms, and $R^9$ is an alkylene group having 1 to 10 carbon atoms or a polyoxyalkylene group.

Examples of the alkyl group having 1 to 6 carbon atoms for $R^8$ include the same alkyl groups as those mentioned above for $R^6$. Above all, a methyl group, an ethyl group, a n-propyl group, an isopropyl group, a n-butyl group, a sec-butyl group, an isobutyl group, and a t-butyl group are preferred.

Examples of the alkylene group having 1 to 10 carbon atoms for $R^9$ include the same alkylene groups as those mentioned above for $R^7$.

$R^9$ is preferably an ethylene group, a propylene group, a tetramethylene group, or a pentamethylene group.

$$HO-R^{10}-SO_3M \quad (5)$$

In the formula, $R^{10}$ is an alkylene group having 1 to 10 carbon atoms, and M is an alkali metal, such as Na and K.

Examples of the alkylene group having 1 to 10 carbon atoms for $R^{10}$ include the same alkylene groups as those mentioned above for $R^7$. Above all, a methylene group and an ethylene group are preferred.

In the general formula (1), $R^3$ represents a divalent residue obtained by removing hydroxy groups from a glycol compound. The glycol compound is preferably at least one selected from the group consisting of ethylene glycol, propylene glycol, 1,4-butanediol, diethylene glycol, dipropylene glycol, triethylene glycol, tripropylene glycol, polyethylene glycol, and polypropylene glycol, and more preferably at least one selected from the group consisting of ethylene glycol, 1,4-butanediol, diethylene glycol, triethylene glycol, and polyethylene glycol.

A weight average molecular weight (Mw) of polyethylene glycol and polypropylene glycol is preferably 2,000 or less from the viewpoint of making it easy to achieve dissolution or dispersion in water or the hydrophilic solvent.

In the general formula (1), X represents a group formed through a reaction between the hydrophilic compound and the diisocyanate compound. For example, in the case where the hydrophilic compound is the general formula (2), (3), or (5), then X is a group represented by the following general formula (6), and in the case where the hydrophilic compound is the general formula (4), then X is a group represented by the following general formula (7).

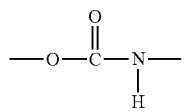

(6)

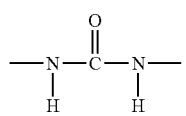

(7)

In the general formula (1), n1 represents a number of 1 to 10, and preferably a number of 1 to 5; n2 represents a number of 1 to 10, and preferably a number of 1 to 5; and m represents a number of 1 to 5, and preferably a number of 1 to 2.

The polycarbodiimide compound (X) is preferably used upon being dissolved or dispersed in at least one selected from water and a hydrophilic solvent.

An equivalent ratio of the carbodiimide group of the polycarbodiimide compound (X) to the carboxy group of the carboxy group-containing aqueous resin is preferably 0.1 to 1.2. When the foregoing equivalent ratio is 0.1 or more, an addition effect of the carbodiimide compound (X) is obtained, and when it is 1.2 or less, the carbodiimide compound (X) does not excessively remain, so that worsening of a performance to be caused due to excessive retention of the carbodiimide compound (X) can be suppressed.

It is preferred that the carboxy group-containing aqueous resin composition of the present invention further contains at least one selected from water and a hydrophilic solvent.

Examples of the hydrophilic solvent include polyalkylene glycol monoalkyl ethers, such as ethylene glycol monomethyl ether, ethylene glycol monoethyl ether, ethylene glycol monobutyl ether, diethylene glycol monoethyl ether, diethylene glycol monobutyl ether, propylene glycol monomethyl ether, and dipropylene glycol monomethyl ether; polyalkylene glycol dialkyl ethers, such as diethylene glycol dimethyl ether, triethylene glycol dimethyl ether, and dipropylene glycol dimethyl ether; polyalkylene glycol monoalkyl ether acetates, such as ethylene glycol monomethyl ether acetate, ethylene glycol monoethyl ether acetate, ethylene glycol monobutyl ether acetate, diethylene glycol monoethyl ether acetate, diethylene glycol monobutyl ether acetate, propylene glycol monomethyl ether acetate, and dipropylene glycol monomethyl ether acetate; polyalkylene glycol diacetates, such as ethylene glycol diacetate and propylene glycol diacetate; polyalkylene glycol monophenyl ethers, such as ethylene glycol monophenyl ether and propylene glycol monophenyl ether; and monoalcohols, such as propanol, butanol, hexanol, and octanol.

The carboxy group-containing aqueous resin composition of the present invention can be appropriately compounded with an additive, such as a pigment, a filler, a leveling agent, a surfactant, a dispersant, an ultraviolet absorber, an antioxidant, a flame retardant, and a coloring agent, as the need arises.

A total content of the carboxy group-containing aqueous resin and the polycarbodiimide compound (X) which are contained in the solid content of the carboxy group-containing aqueous resin composition is preferably 80 to 100% by mass, more preferably 85 to 100% by mass, and still more preferably 95 to 100% by mass.

The carboxy group-containing aqueous resin composition of the present invention can be used for dipping molding in view of the fact that it is excellent in storage stability and less in an increase of viscosity and a lowering of tensile strength of a cured product of the resin composition before and after the storage.

Although the carboxy group-containing aqueous resin composition of the present invention varies with its kind or molecular weight, in general, its viscosity is preferably 20 to 500 mPa·s, and more preferably 30 to 300 mPa·s. In addition, a proportion of viscosity change after the storage at 50° C. for approximately 1 week is preferably 15 times or less, and more preferably 10 times or less. When the proportion of viscosity change is large, since the thickness becomes thick, or the thickness non-uniformity is liable to be generated, a dipping molding condition must be altered every time, and the composition is not easily used, and thus, such is not preferred.

The aforementioned viscosity and proportion of viscosity change can be measured and determined by the methods described in the section of Examples.

Although a tensile strength of a cured product obtained by curing the carboxy group-containing aqueous resin composition of the present invention varies with its kind or molecular weight, it can be regulated to preferably 25 MPa or more, and more preferably 35 MPa or more. In addition, the amount of change of the tensile strength of the cured product obtained by curing the aforementioned resin composition after the storage at 50° C. for approximately 1 week can be regulated to preferably −5 MPa or more, and more preferably −3 MPa or more.

The aforementioned tensile strength and amount of change of the tensile strength can be measured and determined, respectively by the methods described in the section of Examples.

[Production Method of Polycarbodiimide Compound (X)]

A method of producing the polycarbodiimide compound (X) of the present invention includes the following step (A) and step (B):

Step (A): a step of subjecting a diisocyanate compound to a carbodiimidation reaction in the presence of a catalyst, to obtain a polycarbodiimide (Y) having an isocyanate group on both ends thereof, and Step (B): a step of allowing a hydrophilic compound having a functional group capable of reacting with an isocyanate in an amount of 0.5 equivalents or less to a total amount of the isocyanate group which the polycarbodiimide (Y) has on both ends thereof, the polycarbodiimide (Y), and a glycol compound to react with each other.

In the present invention, the glycol compound works as a chain extender of the polycarbodiimide (Y).

[Step (A)]

In the step (A), a diisocyanate compound is subjected to a carbodiimidation reaction in the presence of a catalyst, to obtain a polycarbodiimide (Y) having an isocyanate group on both ends thereof.

As the diisocyanate compound, the compounds enumerated in the section of [Carboxy Group-Containing Aqueous Resin Composition] can be used.

Examples of the catalyst which is used for the carbodiimidation reaction include phosphorene oxides, such as 1-phenyl-2-phosphorene-1-oxide, 3-methyl-1-phenyl-2-phosphorene-1-oxide, 1-ethyl-2-phosphorene-1-oxide, and 3-methyl-2-phosphorene-1-oxide, and 3-phosphorene isomers thereof. Of these, 3-methyl-1-phenyl-2-phosphorene-1-oxide is preferred from the viewpoint of reactivity.

The use amount of the catalyst in the production method of the polycarbodiimide compound (X) is typically 0.01 to 2.0 parts by mass based on 100 parts by mass of the diisocyanate compound to be used for the carbodiimidation.

The carbodiimidation reaction can be performed even in the absence of a solvent and can also be performed in a solvent. Examples of the solvent which can be used include alicyclic ethers, such as tetrahydroxyfuran, 1,3-dioxane, and dioxolane; aromatic hydrocarbons, such as benzene, toluene, xylene, and ethylbenzene; halogenated hydrocarbons, such as chlorobenzene, dichlorobenzene, trichlorobenzene, perclene, trichloroethane, and dichloroethane; and cyclohexanone. These may be used alone or in combination of two or more thereof.

In the case of performing the reaction in the solvent, a concentration of the diisocyanate compound is preferably 5 to 55% by mass, and more preferably 5 to 20% by mass.

Although a condition of the carbodiimidation reaction is not particularly limited, the reaction is performed at preferably 40 to 250° C., and more preferably 80 to 195° C. for preferably 1 to 30 hours, and more preferably 5 to 25 hours. In addition, in the case of performing the reaction in the solvent, the reaction is preferably performed at 40° C. to a boiling point of the solvent, Although the polymerization degrees n1 and n2 of the polycarbodiimide compound (X) are not particularly limited, n1 and n2 are each preferably 1 to 10, and more preferably 1 to 5 from the viewpoint of making it easy to achieve dissolution or dispersion of the polycarbodiimide compound (X) in water or the hydrophilic solvent.

[Step (B)]

In the step (B), a hydrophilic compound having a functional group capable of reacting with an isocyanate in an amount of 0.5 equivalents or less to a total amount of the isocyanate group which the polycarbodiimide (Y) has on both ends thereof, the polycarbodiimide (Y), and a glycol compound are allowed to react with each other.

A method of allowing the polycarbodiimide (Y) obtained in the step (A), the hydrophilic compound, and the glycol compound to react with each other is not particularly limited. Examples thereof include (i) a method in which the polycarbodiimide (Y) is allowed to react with a specified amount of the hydrophilic compound, and the resulting polycarbodiimide (Z) having a hydrophilic group on an end thereof is allowed to react with the glycol compound; (ii) a method in which a compound obtained through a reaction between the polycarbodiimide (Y) and the glycol compound is allowed to react with the hydrophilic compound; and (iii) a method in which the polycarbodiimide (Y), the hydrophilic compound, and the glycol compound are allowed to react with each other at the same time. Above all, the method (i) is preferred from the viewpoint of controlling the matter that the reaction locally proceeds to cause conversion into a high molecular weight.

Specifically, the method (i) includes a step (B1) of allowing the polycarbodiimide (Y) obtained in the step (A) to react with the hydrophilic compound having a functional group capable of reacting with an isocyanate in an amount of 0.5 equivalents or less to a total amount of the isocyanate group which the polycarbodiimide (Y) has on both ends thereof, to obtain a polycarbodiimide (Z) having a hydrophilic group on an end thereof, and a step (B2) of allowing the polycarbodiimide (Z) obtained in the step (B1) to react with a glycol compound, to chain-extend the polycarbodiimide (Z), thereby obtaining the polycarbodiimide compound (X).

In the step (B1), the polycarbodiimide (Y) obtained in the step (A) and the hydrophilic compound having a functional group capable of reacting with an isocyanate in an amount of 0.5 equivalents or less to a total amount of the isocyanate group which the polycarbodiimide (Y) has on both ends thereof are allowed to react with each other, to introduce a hydrophilic group into an end of the polycarbodiimide (Y).

As the hydrophilic compound, the hydrophilic compounds enumerated in the section of [Carboxy Group-Containing Aqueous Resin Composition] can be used.

The use amount of the hydrophilic compound is preferably 0.16 to 0.5 equivalents, and more preferably 0.33 to 0.5 equivalents to the equivalent of the functional group of a total amount of the isocyanate group which the polycarbodiimide (Y) has on both ends thereof. When the use amount of the hydrophilic compound is 0.5 equivalents or less, a side-reaction is controlled, whereby the desired polycarbodiimide compound (X) can be obtained in the step (B2) as mentioned later.

Although a condition of the reaction is not particularly limited, it is preferred that after heating and holding at preferably 50 to 200° C., and more preferably 100 to 180° C., the hydrophilic compound is added, and the reaction is further performed at about 80 to 200° C. for about 0.5 to 5 hours.

In the step (B2), the polycarbodiimide (Z) obtained in the step (B1) is allowed to react with the glycol compound, to chain-extend the polycarbodiimide (Z).

As the glycol compound, the glycol compounds enumerated in the section of [Carboxy Group-Containing Aqueous Resin Composition] can be used.

The use amount of the glycol compound is preferably 0.5 to 0.84 equivalents, and more preferably 0.5 to 0.67 equivalents to the equivalent of the functional group of a total amount of the isocyanate group which the polycarbodiimide (Y) obtained in the step (A) has on both ends thereof. When the use amount of the glycol compound is allowed to fall within the foregoing range, an unreacted product of the polycarbodiimide (Y) obtained in the step (B1) and an unreacted product of the glycol compound are suppressed, whereby the desired polycarbodiimide compound (X) can be obtained.

Although a condition of the reaction is not particularly limited, a reaction temperature is preferably about 80 to 200° C., and a reaction time is preferably about 0.5 to 5 hours.

Although the chain extension unit m of the polycarbodiimide compound (X) is not particularly limited, m is preferably 1 to 5, and more preferably 1 to 2 from the viewpoint of making it easy to achieve dissolution or dispersion of the polycarbodiimide compound (X) in water or the hydrophilic solvent.

The carboxy group-containing aqueous resin composition containing the thus obtained polycarbodiimide compound (X) is excellent in storage stability and less in an increase of viscosity and a lowering of tensile strength of a cured product of the resin composition before and after the storage.

[Molded Article]

The molded article of the present invention is formed of the aforementioned carboxy group-containing aqueous resin composition. Examples of the molded article include a medical probe cover, a fingerstall, gloves, and a condom.

EXAMPLES

The present invention is hereunder specifically described by reference to Examples and Comparative Examples, but it should be construed that the present invention is not limited to embodiments of the Examples.

(Synthesis Example X) Production of Carboxy Group-Containing Aqueous Polyurethane Resin 780 parts by mass of polytetramethylene ether glycol: PTMG-2000 and 33.5 parts by mass of dimethylolpropionic acid: DMPA were charged in a reaction vessel equipped with a reflux tube and a stirrer and stirred under a nitrogen stream at 135° C. for about 1 hour; the resultant was then cooled to 70° C.; 185 parts by mass of isophorone diisocyanate: IPDA was added; and the contents were allowed to react with each other for 5 hours, to obtain an isocyanate-terminated polyurethane prepolymer, As a result of NCO % measurement (automated titration device COM-1700S, manufactured by Hiranuma Sangyo Co., Ltd.), the obtained isocyanate-terminated polyurethane prepolymer had an NCO % of 2.1%.

Subsequently, 26 parts by mass of triethylamine was added to the thus obtained isocyanate-terminated polyurethane prepolymer while stirring, to perform neutralization at 70° C. for 1 hour. Thereafter, water was put thereinto, to obtain an isocyanate-terminated polyurethane prepolymer water dispersion. To the obtained isocyanate-terminated polyurethane prepolymer water dispersion, 7.7 parts by mass of ethylenediamine: EDA as a chain extender and 16.0 parts by mass of adipic acid dihydrazide: ADH were added, and the contents were stirred for 1 hour, to obtain a carboxy group-containing aqueous polyurethane resin. The obtained carboxy group-containing aqueous polyurethane resin had a solid content of 30% and an acid value of 14 mgKOH/g from the addition amount of DMPA.

(Synthesis Example 1) Production of Alicyclic Polycarbodiimide 100 parts by mass of dicyclohexylmethane-4,4'-diisocyanate and 0.5 parts by mass of a carbodiimidation catalyst (3-methyl-1-phenyl-2-phosphorene-1-oxide) were charged in a reaction vessel equipped with a reflux tube and a stirrer and stirred under a nitrogen stream at 180° C. for 7 hours, to obtain isocyanate-terminated poly-4,4'-dicyclohexylmethane carbodiimide (polymerization degree=2.6).

In the obtained isocyanate-terminated poly-4,4'-dicyclohexylmethane carbodiimide, an absorption peak owing to a carbodiimide group was confirmed at a wavelength of approximately 2,150 cm$^{-1}$ by means of infrared absorption (IR) spectral measurement with an infrared spectrophotometer (FT/IR-6100, manufactured by JASCO Corporation).

Subsequently, the thus obtained isocyanate-terminated poly-4,4'-dicyclohexylmethane carbodiimide was allowed to stand for cooling to 100° C., to which was then added polyethylene glycol monomethyl ether (average molecular weight: 550) that is a hydrophilic compound in an amount of 57 parts by mass (0.5 equivalents to the equivalent of the functional group of a total amount of the isocyanate group which the isocyanate-terminated poly-4,4'-dicyclohexylmethane carbodiimide has on both ends thereof) as an end-capping agent, and the contents were heated to 150° C. and allowed to react with each other for about 1 hour while stirring. Thereafter, 1,4-butanediol that is a glycol compound was further added as a chain extender in an amount of 5 parts by mass (0.5 equivalents to the equivalent of the functional group of a total amount of the isocyanate group which the isocyanate-terminated poly-4,4'-dicyclohexylmethane carbodiimide has on both ends thereof), and the contents were allowed to react with each other for about 1 hour while stirring.

The matter that the absorption of the isocyanate group at a wavelength of 2,200 to 2,300 cm$^{-1}$ vanished was confirmed through infrared absorption (IR) spectral measurement, to obtain the polycarbodiimide compound (X). This was cooled to about 80° C., into which was then put water, to obtain a pale yellow transparent polycarbodiimide solution (crosslinking agent 1) having a solid content of 40% by mass.

(Synthesis Examples 2 to 7) Production of Alicyclic Polycarbodiimide

Polycarbodiimide solutions (crosslinking agents 2 to 7) were obtained in the same manner as in Synthetic Example 1, except for changing the diisocyanate compound, the hydrophilic compound (end-capping agent), and the glycol compound (chain extender) to the kinds and compounding amounts described in Table 1 and changing the compounding amount of at least one selected from water and the hydrophilic solvent to one described in Table 2. In Tables 1 and 2, the blank columns express non-compounding.

Synthesis Example 8

100 parts by mass of dicyclohexylmethane-4,4'-diisocyanate and 1 part by mass of a carbodiimidation catalyst (3-methyl-1-phenyl-2-phosphorene-1-oxide) were charged in a reaction vessel equipped with a reflux tube and a stirrer and stirred under a nitrogen stream at 185° C. for 22 hours, to obtain isocyanate-terminated poly-4,4'-dicyclohexylmethane carbodiimide (polymerization degree=6).

In the obtained isocyanate-terminated poly-4,4'-dicyclohexylmethane carbodiimide, an absorption peak owing to a carbodiimide group was confirmed at a wavelength of approximately 2,150 cm$^{-1}$ by means of infrared absorption (IR) spectral measurement with an infrared spectrophotometer (FT/IR-6100, manufactured by JASCO Corporation).

Subsequently, the thus obtained isocyanate-terminated poly-4,4'-dicyclohexylmethane carbodiimide was allowed to stand for cooling to 120° C., to which was then added 60 parts by mass of polyethylene glycol monomethyl ether (average molecular weight: 550) as an end-capping agent, and the contents were further allowed to react with each other at the same temperature for 1 hour while stirring. The resultant was again heated to 150° C. and further allowed to react with each other for 5 hours while stirring, and then, the matter that the absorption of the isocyanate group at a wavelength of 2,200 to 2,300 cm$^{1}$ vanished was confirmed through infrared absorption (IR) spectral measurement, to obtain the polycarbodiimide compound (X). This was cooled to about 80° C., into which was then put water, to obtain a pale yellow transparent polycarbodiimide solution (crosslinking agent 8) having a solid content of 40% by mass.

Synthesis Example 9

100 parts by mass of dicyclohexylmethane-4,4'-diisocyanate and 1 part by mass of a carbodiimidation catalyst (3-methyl-1-phenyl-2-phosphorene-1-oxide) were charged in a reaction vessel equipped with a reflux tube and a stirrer and stirred under a nitrogen stream at 180° C. for 15 hours, to obtain isocyanate-terminated poly-4,4'-dicyclohexylmethane carbodiimide (polymerization degree=4).

In the obtained isocyanate-terminated poly-4,4'-dicyclohexylmethane carbodiimide, an absorption peak owing to a carbodiimide group was confirmed at a wavelength of approximately 2,150 cm$^{-1}$ by means of infrared absorption (IR) spectral measurement with an infrared spectrophotometer (FT/IR-6100, manufactured by JASCO Corporation).

Subsequently, the thus obtained isocyanate-terminated poly-4,4'-dicyclohexylmethane carbodiimide was allowed to stand for cooling to 120° C., to which were then added 10 parts by mass of polyethylene glycol monomethyl ether (average molecular weight: 500) and 18 parts by mass of N,N-diethyl isopropanolamine as end-capping agents, and the contents were further allowed to react with each other at the same temperature for 1 hour while stirring. The resultant was again heated to 150° C. and further allowed to react with each other for 5 hours while stirring, and then, the matter that the absorption of the isocyanate group at a wavelength of 2,200 to 2,300 cm$^{-1}$ vanished was confirmed through infrared absorption (IR) spectral measurement, to obtain the polycarbodiimide compound (X). This was cooled to about 80° C., into which was then put water, to obtain a milk white polycarbodiimide emulsion (crosslinking agent 9) having a solid content of 40% by mass.

TABLE 1

|  |  |  | Synthesis Example | | | | | | | | |
|---|---|---|---|---|---|---|---|---|---|---|---|
|  |  | Unit | 1 | 2 | 3 | 4 | 5 | 6 | 7 | 8 | 9 |
| Diisocyanate compound | HMDI | Parts by mass | 100 | 100 | 100 | 100 | 100 | 100 | 100 | 100 | 100 |
| Glycol compound (Chain extender) | 1,4-BDO | Parts by mass | 5 | 4 | 7 |  |  |  | 9 |  |  |
|  | EG | Parts by mass |  |  |  | 5 |  |  |  |  |  |
|  | PEG (1000) | Parts by mass |  |  |  |  | 77 |  |  |  |  |
|  | PEG (2000) | Parts by mass |  |  |  |  |  | 106 |  |  |  |
| Hydrophilic compound (End-capping agent) | PEGME (550) | Parts by mass | 57 | 50 | 84 | 63 | 86 | 59 | 57 | 60 |  |
|  | PEGME (400) | Parts by mass |  |  |  |  |  |  |  |  |  |
|  | PEGME (500) | Parts by mass |  |  |  |  |  |  |  |  | 10 |
|  | DEIPA | Parts by mass |  |  |  |  |  |  |  |  | 18 |
| Polymerization degree of polycarbodiimide (n1 and n2 in the general formula (1)) | — |  | 2.6 | 3.3 | 1.5 | 1.5 | 1.5 | 2.6 | 1.5 | 6 | 4 |
| m in the general formula (1) | — |  | 1 | 1 | 1 | 1 | 1 | 1 | 2 | — | — |
| Polymerization degree of polycarbodiimide in one molecule | — |  | 5.2 | 6.6 | 3 | 3 | 3 | 5.2 | 3 | 6 | 4 |

Details of each of the components described in Table 1, which were used for synthesis of the polycarbodiimide, are as follows.

[Diisocyanate Compound]
HMDI: Dicyclohexylmethane-4,4'-diisocyanate
[Glycol Compound (Chain Extender)]
1,4-BDO: 1,4-Butanediol
EG: Ethylene glycol
PEG (1000): Polyethylene glycol (weight average molecular weight: 1,000)
PEG (2000): Polyethylene glycol (weight average molecular weight: 2,000)
[Hydrophilic Compound (End-Capping Agent)]
PEGME (400): Polyethylene glycol monomethyl ether (average molecular weight: 400)
PEGME (500): Polyethylene glycol monomethyl ether (average molecular weight: 500)
PEGME (550): Polyethylene glycol monomethyl ether (average molecular weight: 550)
DEIPA: Diethyl isopropanolamine

TABLE 2

|  |  |  | Crosslinking agent | | | | | | | | |
|---|---|---|---|---|---|---|---|---|---|---|---|
|  |  | Unit | 1 | 2 | 3 | 4 | 5 | 6 | 7 | 8 | 9 |
| Polycarbodiimide compound (X) |  | Parts by mass | 40 | 40 | 40 | 40 | 40 | 40 | 40 | 40 | 40 |
| Water or hydrophilic solvent | Water | Parts by mass | 60 | 60 | 60 | 60 | 60 | 60 | 30 | 60 | 60 |
|  | Polyethylene glycol monomethyl ether | Parts by mass |  |  |  |  |  |  | 30 |  |  |

Examples 1 to 11 and Comparative Examples 1 and 2

The polycarbodiimide solution (crosslinking agent) produced in each of Synthesis Examples 1 to 9 and the carboxy group-containing aqueous polyurethane resin produced in Synthesis Example X were mixed and stirred in compounding amounts described in Table 3, thereby a carboxy group-containing aqueous resin composition.

Characteristics of the carboxy group-containing aqueous polyurethane resin composition prepared in each of Examples 1 to 11 and Comparative Examples 1 and 2 were measured and evaluated under a measurement condition shown below. The evaluation results are shown in Table 3.

<Evaluation Items>

(1) Viscosity

The carboxy group-containing aqueous polyurethane resin composition was measured for an initial viscosity (at 25° C.) by using a B-type viscometer, then stored in a thermostat at 50° C. for 1 week, and again measured for the viscosity (at 25° C.). A proportion of viscosity change was determined according to the following calculation formula.

Proportion of viscosity change (times)=(Viscosity after storage for 1 week)/(Initial viscosity)

(2) Tensile Strength

The carboxy group-containing aqueous polyurethane resin composition was dipped in a mold and then pulled up, followed by drying at 80° C. for 5 minutes and then at 150° C. for 1 minute. Thereafter, the second dipping was performed and dried at 80° C. for 5 minutes and then at 150° C. for 10 minutes, followed by peeling to produce a film having a thickness of 0.03 mm. The obtained film was cut out into a dumbbell No. 2 specimen on a basis of JIS K6295 and measured for tensile strength (at 23±2° C.) by using a tensile tester (STROGRAPH VG1-E, manufactured by Toyo Seiki Seisaku-sho, Ltd.). In addition, with respect to the carboxy group-containing aqueous polyurethane resin composition stored in a thermostat at 50° C. for 1 week, a sample was produced in the same manner, and the tensile strength of the sample was measured. The amount of change of tensile strength was determined according to the following calculation formula.

Amount of change of tensile strength (MPa)=(Tensile strength of sample after storage for 1 week)−(Tensile strength of initial sample)

TABLE 3

| | Polycarbodiimide compound (crosslinking agent) | Carboxy group-containing aqueous resin | (Carbodiimide group equivalent)/ (Carboxy group equivalent) | Initial viscosity [mPa·s] | Viscosity after storage at 50° C. for 1 week [mPa·s] | Proportion of viscosity change {(Viscosity after storage)/ (Initial viscosity)} [times] | Tensile strength (at the initial stage) [MPa] | Tensile strength after storage at 50° C. for 1 week [MPa] | Amount of change of tensile strength {(Tensile strength after storage) − (Initial tensile strength)} [MPa] |
|---|---|---|---|---|---|---|---|---|---|
| Example 1 | Crosslinking agent 1 | Polyurethane resin | 0.1 | 50 | 77.5 | 1.6 | 26.1 | 25.59 | −0.55 |
| Example 2 | Crosslinking agent 1 | Polyurethane resin | 0.5 | 40 | 150 | 3.8 | 40.0 | 41.57 | 1.59 |
| Example 3 | Crosslinking agent 1 | Polyurethane resin | 0.8 | 50 | 292.5 | 5.9 | 42.8 | 41.78 | −0.97 |
| Example 4 | Crosslinking agent 1 | Polyurethane resin | 1 | 45 | 220 | 4.9 | 40.5 | 40.10 | −0.40 |
| Example 5 | Crosslinking agent 1 | Polyurethane resin | 1.2 | 42.5 | 195 | 4.6 | 40.2 | 36.36 | −3.87 |
| Example 6 | Crosslinking agent 2 | Polyurethane resin | 0.5 | 60 | 285 | 4.8 | 37.6 | 42.64 | 5.06 |
| Example 7 | Crosslinking agent 3 | Polyurethane resin | 0.5 | 42.5 | 210 | 4.9 | 40.3 | 38.72 | −1.56 |
| Example 8 | Crosslinking agent 4 | Polyurethane resin | 0.5 | 37.5 | 247.5 | 6.6 | 39.9 | 40.39 | 0.52 |
| Example 9 | Crosslinking agent 5 | Polyurethane resin | 0.5 | 35 | 60 | 1.7 | 26.4 | 27.74 | 1.34 |
| Example 10 | Crosslinking agent 6 | Polyurethane resin | 0.5 | 165 | 222.5 | 1.3 | 33.6 | 34.80 | 1.19 |
| Example 11 | Crosslinking agent 7 | Polyurethane resin | 0.5 | 55 | 277.5 | 5.0 | 39.1 | 41.64 | 2.53 |
| Comparative Example 1 | Crosslinking agent 8 | Polyurethane resin | 0.5 | 55 | 1400 | 25.5 | 40.8 | 36.18 | −4.59 |
| Comparative Example 2 | Crosslinking agent 9 | Polyurethane resin | 0.5 | 55 | 75 | 1.4 | 36.2 | 29.04 | −7.13 |

CONCLUSION OF RESULTS

It is noted from Table 3 that in the aqueous resin composition in which the carbodiimide compound of an aqueous solution type is compounded as in Comparative Example 1, the liquid viscosity was increased owing to the storage, whereas in the carboxy group-containing aqueous resin composition of the present invention, the viscosity increase was a few, the viscosities at the initial stage and after the storage at 50° C. for approximately 1 week were 20 to 500 mPa·s, and the proportion of viscosity change was 15 times or less. In addition, in the aqueous resin composition in which the carbodiimide compound of an emulsion type is compounded as in Comparative Example 2, though the change of liquid viscosity after the storage is a few, the strength of the coating film formed of the aqueous resin composition after the storage is significantly lowered as compared with the strength of the coating film formed of the aqueous resin composition before the storage (at the initial stage), so that the strength retention becomes worsened. On the other hand, in the carboxy group-containing aqueous resin composition of the present invention, a lowering of the tensile strength was a few, the tensile strengths of cured products prepared by curing the resin composition at the initial stage and after the storage at 50° C. for approximately 1 week were 25 MPa or more, and the amount of change of the tensile strength was −5 MPa or more.

From the foregoing results, according to the present invention, it is possible to provide a carboxy group-containing aqueous resin composition having excellent storage stability; a molded article formed of the resin composition;

and a method of producing a polycarbodiimide compound to be used for the resin composition.

The invention claimed is:

1. A carboxy group-containing aqueous resin composition comprising a carboxy group-containing aqueous resin and a polycarbodiimide compound (X) represented by the following general formula (1):

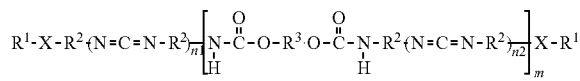

(1)

wherein $R^1$ represents a residue obtained by removing a functional group capable of reacting with an isocyanate from a hydrophilic compound having the functional group capable of reacting with an isocyanate; $R^2$ represents a divalent residue obtained by removing isocyanate groups from a diisocyanate compound; $R^3$ represents a divalent residue obtained by removing hydroxy groups from a glycol compound; X represents a group to be formed through a reaction between the hydrophilic compound and the diisocyanate compound; n1 represents a number of 1 to 10; n2 represents a number of 1 to 10; m represents a number of 1 to 5; and plural $R^1$'s may be the same or different and plural $R^2$'s may be the same or different, wherein the glycol compound is at least one selected from the group consisting of ethylene glycol, propylene glycol, 1,4-butanediol, diethylene glycol, dipropylene glycol, triethylene glycol, and tripropylene glycol, and wherein the hydrophilic compound is at least one selected from the group consisting of the following general formulae (2), (3), and (5):

$$R^4O-(CH_2-CHR^5-O)_p-H \quad (2)$$

wherein $R^4$ is an alkyl group having 1 to 4 carbon atoms; $R^5$ is a hydrogen atom or a methyl group; and p is an integer of 4 to 30, $$(R^6)_2-N-R^7-OH \quad (3)$$

wherein $R^6$ is an alkyl group having 1 to 6 carbon atoms, and $R^7$ is an alkylene group having 1 to 10 carbon atoms or a polyoxyalkylene group, and $$HO-R^{10}-SO_3M \quad (5)$$

wherein $R^{10}$ is an alkylene group having 1 to 10 carbon atoms, and M is an alkali metal.

2. The carboxy group-containing aqueous resin composition according to claim 1, wherein the carboxy group-containing aqueous resin is an aqueous polyurethane resin, an acrylic resin, a polyester resin, or a rubber-based latex resin.

3. The carboxy group-containing aqueous resin composition according to claim 1, wherein the carboxy group-containing aqueous resin is an aqueous polyurethane resin.

4. The carboxy group-containing aqueous resin composition according to claim 1, wherein the diisocyanate compound is dicyclohexylmethane-4,4'-diisocyanate.

5. The carboxy group-containing aqueous resin composition according to claim 1, further comprising at least one selected from water and a hydrophilic solvent.

6. The carboxy group-containing aqueous resin composition according to claim 1, wherein an equivalent ratio of the carbodiimide group of the polycarbodiimide compound (X) to the carboxy group of the carboxy group-containing aqueous resin is from 0.1 to 1.2.

7. The carboxy group-containing aqueous resin composition according to claim 1, which is used for dipping molding.

8. A molded article, which is formed of the carboxy group-containing aqueous resin composition according to claim 7.

9. A method of producing a polycarbodiimide compound (X) represented by the general formula (1):

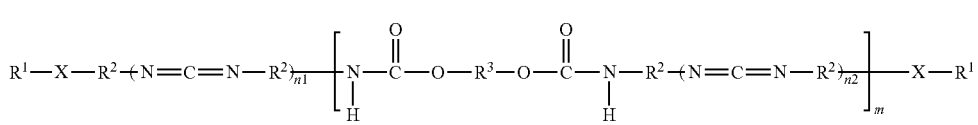

(1)

wherein $R^1$ represents a residue obtained by removing a functional group capable of reacting with an isocyanate from a hydrophilic compound having the functional group capable of reacting with an isocyanate; $R^2$ represents a divalent residue obtained by removing isocyanate groups from a diisocyanate compound; $R^3$ represents a divalent residue obtained by removing hydroxy groups from a glycol compound; X represents a group to be formed through a reaction between the hydrophilic compound and the diisocyanate compound; n1 represents a number of 1 to 10; n2 represents a number of 1 to 10; m represents a number of 1 to 5; and plural $R^1$'s may be the same or different and plural $R^2$'s may be the same or different;

the method comprising the following step (A) and step (B):

Step (A): a step of subjecting a diisocyanate compound to a carbodiimidation reaction in the presence of a catalyst, to obtain a polycarbodiimide (Y) having an isocyanate group on both ends thereof; and Step (B): a step of allowing a hydrophilic compound having a functional group capable of reacting with an isocyanate in an amount of 0.5 equivalents or less to a total amount of the isocyanate group which the polycarbodiimide (Y) has on both ends thereof, the polycarbodiimide (Y), and a glycol compound to react with each other;

wherein the glycol compound is at least one selected from the group consisting of ethylene glycol, propylene glycol, 1,4-butanediol, diethylene glycol, dipropylene glycol, triethylene glycol, and tripropylene glycol, and wherein the hydrophilic compound is at least one selected from the group consisting of the following general formulae (2), (3), and (5):

$$R^4O-(CH_2-CHR^5-O)_p-H \quad (2)$$

wherein $R^4$ is an alkyl group having 1 to 4 carbon atoms; $R^5$ is a hydrogen atom or a methyl group; and p is an integer of 4 to 30, $$(R^6)_2-N-R^7-OH \quad (3)$$

wherein $R^6$ is an alkyl group having 1 to 6 carbon atoms, and $R^7$ is an alkylene group having 1 to 10 carbon atoms or a polyoxyalkylene group, and $$HO-R^{10}-SO_3M \qquad (5)$$

wherein $R^{10}$ is an alkylene group having 1 to 10 carbon atoms, and M is an alkali metal.

10. The method of producing a polycarbodiimide compound (X) according to claim 9, wherein the step (B) includes a step (B1) of allowing the polycarbodiimide (Y) to react with the hydrophilic compound having a functional group capable of reacting with an isocyanate in an amount of 0.5 equivalents or less to a total amount of the isocyanate group which the polycarbodiimide (Y) has on both ends thereof, to obtain a polycarbodiimide (Z) having a hydrophilic group on an end thereof; and a step (B2) of allowing the polycarbodiimide (Z) obtained in the step (B1) to react with a glycol compound, to chain-extend the polycarbodiimide (Z), thereby obtaining the polycarbodiimide compound (X), and wherein the glycol compound is at least one selected from the group consisting of ethylene glycol, propylene glycol, 1,4-butanediol, diethylene glycol, dipropylene glycol, triethylene glycol, and tripropylene glycol.

* * * * *